(12) United States Patent
Okazaki et al.

(10) Patent No.: US 12,316,189 B2
(45) Date of Patent: May 27, 2025

(54) MAGNETIC FLUX MODULATION TYPE MAGNETIC GEAR (71) Applicant: Mitsubishi Electric Corporation, Tokyo (JP)

(72) Inventors: Kodai Okazaki, Tokyo (JP); Junji Kitao, Tokyo (JP); Yoshihiro Miyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 18/008,667

(22) PCT Filed: Dec. 1, 2020

(86) PCT No.: PCT/JP2020/044593
§ 371 (c)(1),
(2) Date: Dec. 7, 2022

(87) PCT Pub. No.: WO2022/030031
PCT Pub. Date: Feb. 10, 2022

(65) Prior Publication Data
US 2023/0246536 A1 Aug. 3, 2023

(30) Foreign Application Priority Data
Aug. 3, 2020 (JP) ................................. 2020-131387

(51) Int. Cl.
H02K 49/10 (2006.01)
(52) U.S. Cl.
CPC .................................. H02K 49/102 (2013.01)
(58) Field of Classification Search
CPC ..... H02K 1/2766; H02K 49/102; H02K 51/00
(Continued)

(56) References Cited

U.S. PATENT DOCUMENTS

2010/0289365 A1* 11/2010 Bando .................... H02K 16/00
310/156.01
2011/0012458 A1* 1/2011 Atallah .................. H02K 51/00
310/103

(Continued)

FOREIGN PATENT DOCUMENTS

CN 105305682 A 2/2016
JP 5526281 B2 6/2014

OTHER PUBLICATIONS

International Search Report and Written Opinion mailed on Jan. 12, 2021, received for PCT Application PCT/JP2020/044593, filed on Dec. 1, 2020, 8 pages including English Translation.
(Continued)

Primary Examiner — Michael Andrews
(74) Attorney, Agent, or Firm — XSENSUS LLP (57) ABSTRACT In the magnetic flux modulation type magnetic gear which uses pole pieces, improvement in demagnetization resistance and suppression of the reduction in torque were issues. Therefore, to the pole pieces provided in a torus shape, a magnetic flux modulation type magnetic gear arranges concentrically a first rotator on the inside of the pole piece and a second rotator on the outside, so that the rotors can be rotated relatively, with the center of the pole pieces as the rotation axis, wherein a first hole part stores, on the inside of the rotator, a first permanent magnet prepared in the rotator, having inclination of a predetermined angle, with respect to the line segment which shows a magnetic pole center, when viewed from the rotation axis. The magnetic gear is configured so as to use the amount of permanent magnets as much as possible.

8 Claims, 9 Drawing Sheets (58) Field of Classification Search
USPC .................................................. 310/103, 104
See application file for complete search history.

(56) References Cited

U.S. PATENT DOCUMENTS

| | | | |
|---|---|---|---|
| 2013/0320795 A1* | 12/2013 | Enomoto | H02K 49/10 310/103 |
| 2015/0076948 A1* | 3/2015 | Katou | H02K 7/11 310/103 |
| 2016/0028279 A1* | 1/2016 | Hao | H02K 1/02 310/156.43 |
| 2022/0052596 A1* | 2/2022 | Ukaji | H02K 7/116 |

OTHER PUBLICATIONS

Chinese Office Action issued Jan. 27, 2025, in Chinese Patent Application No. 202080104855.2, 15pp.

* cited by examiner

MAGNETIC FLUX MODULATION TYPE MAGNETIC GEAR

CROSS-REFERENCE TO RELATED APPLICATIONS

The present application is based on PCT filing PCT/JP2020/044593, filed Dec. 1, 2020, which claims priority to JP 2020-131387, filed Aug. 3, 2020, the entire contents of each are incorporated herein by reference.

FIELD OF THE INVENTION

The present application relates to the field of a magnetic flux modulation type magnetic gear.

BACKGROUND OF THE INVENTION

General magnetic gears have a structure in which the teeth of a mechanical gear are simply replaced with permanent magnets. Therefore, the magnetic gear can accelerate and decelerate without contact, and has low vibrations and noises, and is expected to achieve an improvement in maintainability. However, in the transmission of torque by permanent magnets, only some magnets facing each other contribute to the torque transmission. Then, the magnetic gear has small torque as compared with the mechanical gear. On the other hand, magnetic flux modulation type magnetic gears are adopted, which are constituted with an inner side rotor whose permanent magnets are pasted on an outer periphery surface, reversing their polarities alternately in a circumference direction, in order to produce a larger torque; an outer side rotor whose permanent magnets are pasted on an inner periphery surface, reversing their polarities alternately in the circumference direction; and a plurality of magnetic pole parts, which are each called a pole piece and arranged between the inner rotor and the outer rotor, at a regular interval in the circumference direction.

Furthermore, in order to reduce the eddy current which occurs on the inside of a magnet, and to transmit torque efficiently, the Patent Document 1 proposes a structure in which permanent magnets that constitute an inner side rotor and an outer side rotor are embedded on the inside of magnetic materials.

CITATION LIST

Patent Literature

Patent Document 1: Japanese Patent No. 5526281

SUMMARY OF THE INVENTION

Technical Problem

However, the pole pieces use non-conducting materials, such as resin, and are arranged at a regular interval in the circumference direction. Additionally, since a magnetic vacant part is provided between the pole pieces, magnetic resistance in the passage course of magnetic flux is increased by the vacant part, where the magnetic flux passes through permanent magnets of the inner side rotor and the outer side rotor, which face in the diameter direction of a pole piece. Then, there arises the subject that the operating temperature of the permanent magnet is lowered and demagnetization becomes easy to occur.

In particular, when the magnetic flux modulation type magnetic gear is used as a magnetic flux modulation type magnetic gear on the inside of the driving system of a vehicle, thermal demagnetization can be thought to occur, where the thermal demagnetization is induced by a high velocity revolution of 10,000 r/mm or more, and by a high temperature environment due to the heat conduction from an engine. Then, the improvement in the demagnetization resistance is indispensable. In the magnetic flux modulation type magnetic gear which is shown in the Patent Document 1, permanent magnets are embedded in the magnetic material of the rotor. Then, since the permanent magnets are farther away from pole pieces, there arises a problem that magnetic coupling force is lowered and the torque which can be transmitted is reduced.

The present application is made in order to solve the above-mentioned problem. The aim is to simultaneously achieve the improvement in the demagnetization resistance and the suppression of reduction in the transmission torque. Additionally, the present application aims at improving the operating performance, under a high velocity revolution and a high temperature environment.

Solution to Problem

The magnetic flux modulation type magnetic gear disclosed in the present application includes
 a ring component, which has pole pieces provided in a torus shape,
 a first rotator, which is arranged concentrically with the ring component and on the inside of the ring component, has a plurality of magnetic poles, each provided with a first permanent magnet, and can rotate relative to the pole pieces, setting a center of the ring component as a rotation axis, and
 a second rotator, which is arranged concentrically with the ring component and on the outside of the ring component, and has a plurality of magnetic poles, each provided with a second permanent magnet, and can rotate relative to the pole piece, setting the center of the ring component as the rotation axis,
 wherein, on the inside of the first rotator, there is provided with a first hole part for storing the first permanent magnet, having inclination of a predetermined angle with respect to a line segment, which shows a magnetic pole center, when viewed from the rotation axis.

Advantageous Effects of Invention

While the improvement in the demagnetization resistance of the permanent magnets which constitute the magnetic flux modulation type magnetic gear is achieved, the reduction of transmission torque can be suppressed.

DESCRIPTION OF EMBODIMENTS

Embodiment 1

Figure 1:
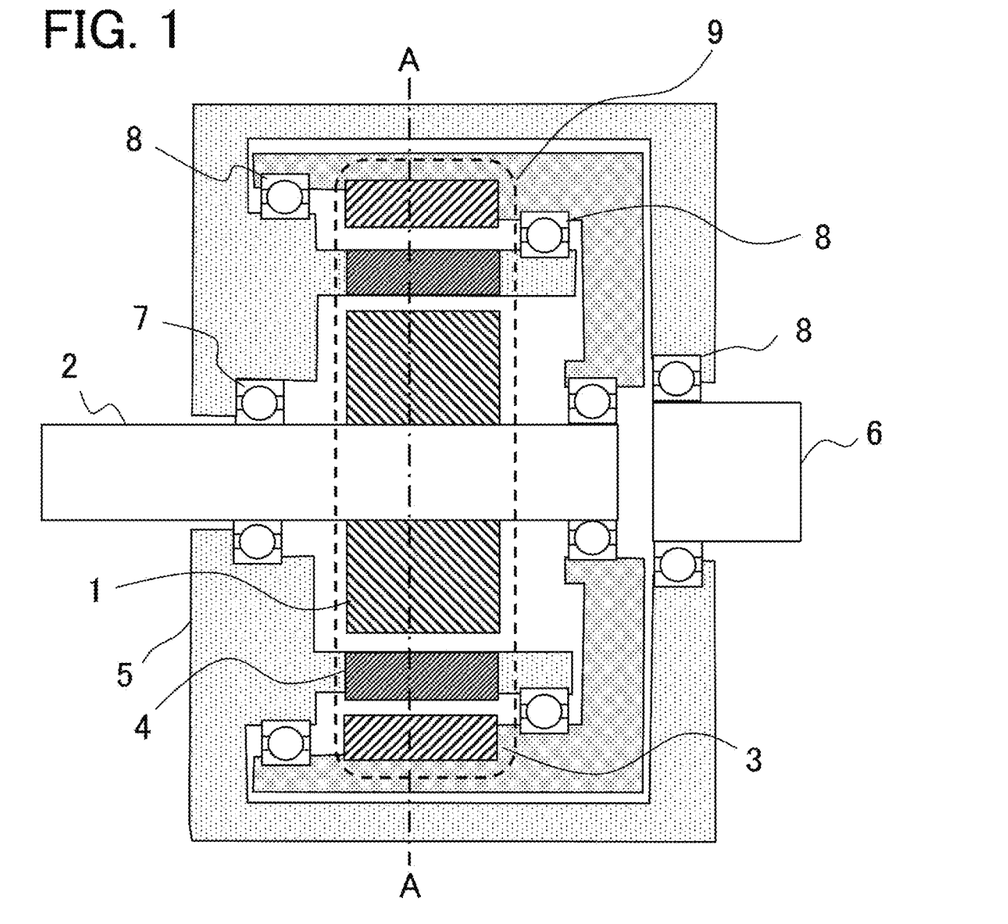
FIG. 1 is a sectional view which is along the rotation axis of the magnetic flux modulation type magnetic gear according to the Embodiment 1.

FIG. 1 is a sectional view which is along the rotation axis of the magnetic flux modulation type magnetic gear according to the Embodiment 1. It is worth noticing that, the same symbols in the following drawings show the same or corresponding portions. FIG. 1 shows the schematic constitution of the magnetic flux modulation type magnetic gear, which is an object of the present application. The magnetic flux modulation type magnetic gear shown here is a magnetic flux modulation type magnetic gear of radial type.

In the magnetic flux modulation type magnetic gear of radial type, arranged are a first rotator 1 and a second rotator 3, which are different in the inside diameter, and arranged concentrically with respect to the rotation center of the first rotation axis 2 of the first rotator 1; magnetic bodies, each called a pole piece (hereinafter, referred to as a pole piece 4); and a stator 5, which is formed, as a ring component, by a plurality of pole pieces 4 provided in a torus shape. Additionally, the first rotator 1 is arranged at the inner side of the stator 5, i.e., at an inner periphery side, and the second rotator 3 is arranged at the outer side of the stator 5, i.e., at an outer periphery side. The first rotator 1 is attached to a first rotation axis 2, and the second rotator 3 is attached to a second rotation axis 6. A first bearing 7 is provided between the first rotator 1 and the stator 5, a second bearing 8 is provided between the stator 5 and the second rotator 3, and the first rotator 1 and the second rotator 3 are each configured so as to rotate independently.

Figure 2:
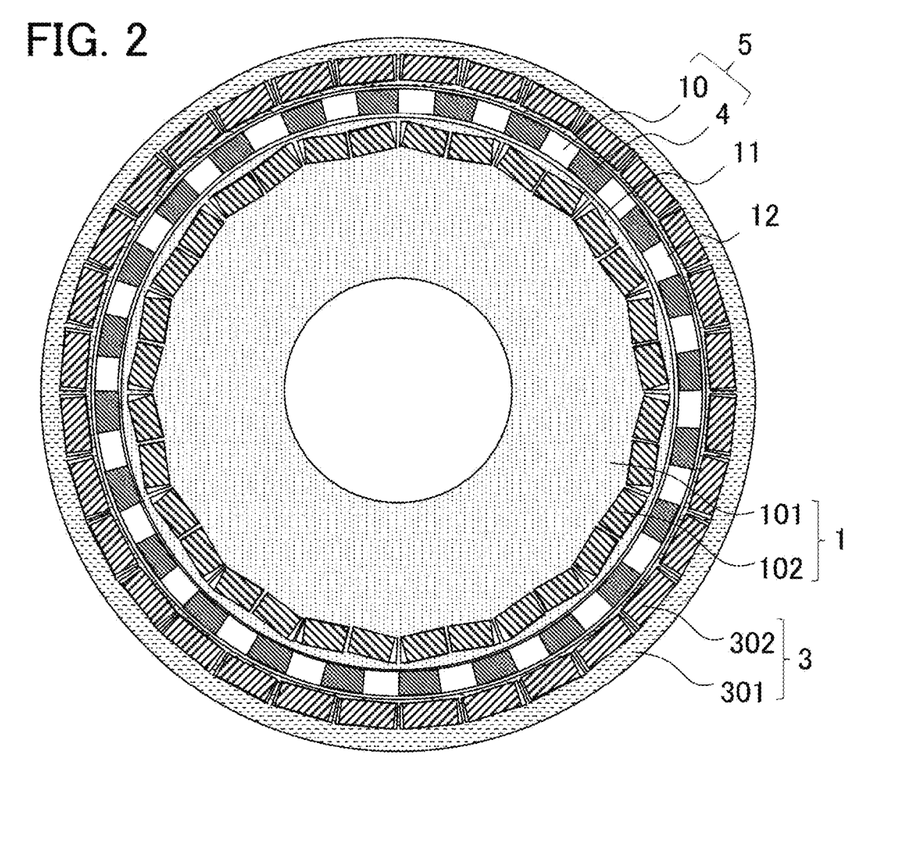
FIG. 2 is a sectional view of the magnetic flux modulation type magnetic gear according to the Embodiment 1.

FIG. 2 shows the constitution of a magnetic coupling part 9 which is shown in FIG. 1, and is a sectional view which is taken along the line A-A in FIG. 1. The stator 5 has twenty-four pole pieces 4, which are made of magnetic materials and arranged at a regular interval in a torus; and stator parts 10, which are made of non-conducting materials and fulfill the interspaces between pole pieces 4, for fixing the pole pieces 4.

The first rotator 1, which is arranged at the inner diameter side of the stator 5, is arranged with respect to the inner diameter surface of circumferential shape of the pole piece 4, via a first magnetic vacant part 11. The first rotator 1 becomes a small in number pole rotor, which is formed by embedding thirty-two first permanent magnets 102 of flat plate shape, on the inside of the first magnetic material 101.

That is, two permanent magnets constitute one magnetic pole. The second rotator 3, which is arranged at the outer diameter side of the stator 5, is arranged with respect to the outer diameter surface of circumferential shape of the pole piece 4, via a second magnetic vacant part 12. The second rotator 3 becomes a large in number pole rotor, which is formed by embedding thirty-two second permanent magnets 302 of flat plate shape, in the second magnetic material 301. That is, one permanent magnet constitutes one magnetic pole.

Figure 3:
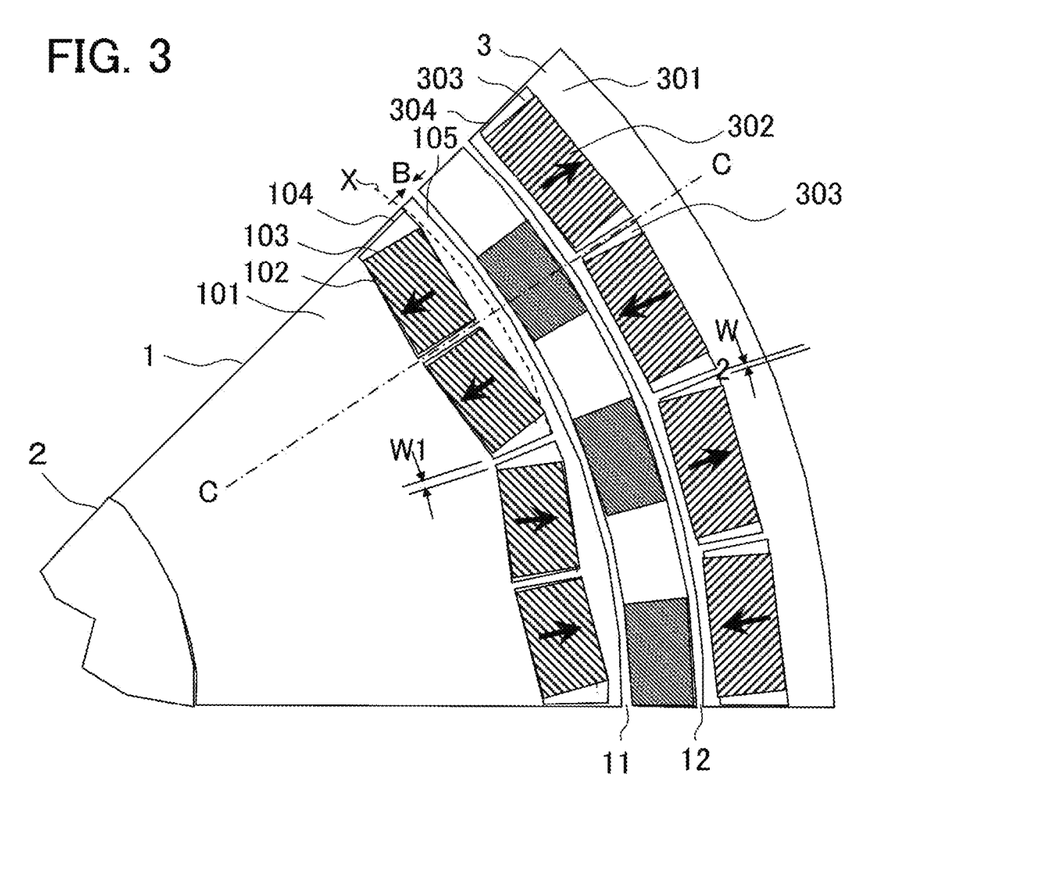
FIG. 3 is a partial sectional view of the magnetic flux modulation type magnetic gear according to the Embodiment 1.

FIG. 3 is a magnified view, regarding the magnetic flux modulation type magnetic gear which is shown in FIG. 2, where the magnified view includes a small in number pole rotor, i.e., two magnetic poles of the first rotator 1; a large in number pole rotor, i.e., four magnetic poles of the second rotator 3; and a stator 5. As for the first permanent magnet 102 of the first rotator 1, two permanent magnets which adjoin each other constitute one magnetic pole. Additionally, the first permanent magnet is magnetized in the direction where the magnetic flux heads toward the first magnetic vacant part 11, and in addition, as for the magnetism, magnetization directions are arranged so as to be reversed for every adjoining magnetic pole.

The first permanent magnet 102 is of flat plate shape. In one magnetic pole, permanent magnets are in a symmetrical arrangement, with regard to the line segment (the dashed line C of FIG. 3) which shows the magnetic pole center, when viewed from the center of the first rotation axis 2. In addition, when an angle which is made between the direction of the first permanent magnet 102 and the line segment (the dashed line C of FIG. 3) which shows the magnetic pole center, when viewed from the center of the first rotation axis 2 is set to be θ, the angle which satisfies the relation of θ<90° is predetermined.

As for the second permanent magnet 302 of the second rotator 3, one permanent magnet constitutes one magnetic pole. Additionally, the second permanent magnet is magnetized in the direction where magnetic flux heads toward the second magnetic vacant part 12, and in addition, magnetization directions are arranged so as to be reversed for every adjoining magnetic pole. As for the first permanent magnet 102, a permanent magnet is arranged in the direction farther away from a magnetic vacant part, rather than a circular arc X of the first permanent magnets 102, which constitute one magnetic pole of the first rotator 1, where the circular arc passes the nearest point B to the first magnetic vacant part 11, and has the rotation center of the first rotator 1 (the center of the first rotation axis 2 corresponds to) as the origin. In other words, the first permanent magnets 102 are embedded, in the direction from the outer periphery surface of the first rotator 1 toward the first rotation axis 2, rather than the position of the point B.

Moreover, at the end part of the longitudinal direction of the first permanent magnet 102 of the first rotator 1, first hollow parts 103 which prevent the short circuit of magnetic flux are formed, and at the end part of the second permanent magnet 302 of the second rotator 3, second hollow parts 303 which prevent the short circuit of magnetic flux are formed. In other words, in the first rotator 1, the first hole part 104 which stores the first permanent magnet 102 is formed. Additionally, as for the first permanent magnet 102 which is stored on the inside of this first hole part 104, there remains a space of the first hollow part 103 at the end part. Similarly, the second rotator 3 also has a second hole part 304, and the second permanent magnet 302 is stored in the second hole part 304. Additionally, at the end part of the second permanent magnet 302, there remains a space of the second hollow part 303.

Figure 4:
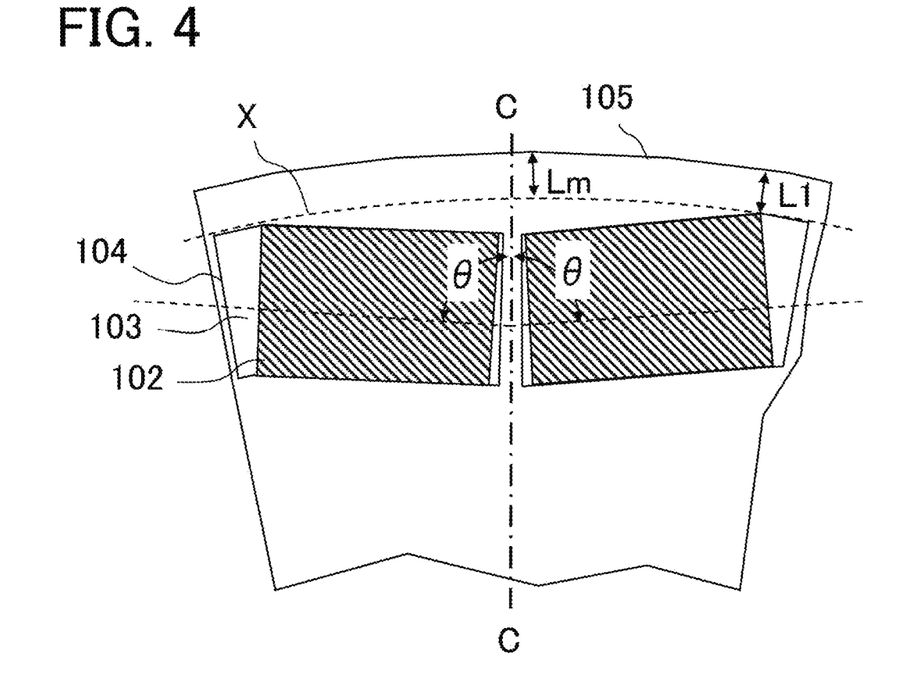
FIG. 4 is a partial sectional view of the first rotator according to the Embodiment 1.

The constitution of one magnetic pole of the first rotator 1 in FIG. 3 is shown in the magnified view of FIG. 4. The first hole part 104 is a hollow which is included on the inside of the first rotator 1. That is, constituted is a bridge part 105 which has the thickness from the outer periphery surface of the first rotator 1 to the inner wall surface of the first hole part 104. As shown in FIG. 4, the first hole part 104 is formed on the inner side of the circular arc X with a length Lm. Here, the length Lm is a minimum value for easing stress concentration, corresponding to the centrifugal force applied to the first permanent magnet 102. Therefore, as the length of the bridge part 105 in the radial direction, it will be satisfactory if this length is larger than the minimum length Lm. In this FIG. 4, shown is a case where the length Lm and the length L1 are equal.

Constituting the bridge part 105 in the radial direction means that the first permanent magnet 102 of the first rotator 1 is embedded in the direction farther away from the first magnetic vacant part 11. As for the second rotator 3, also in the relation between the second permanent magnet 302 and the second magnetic vacant part 12, a bridge part in the radial direction exists. However, a centrifugal force which is applied to the second permanent magnet 302 acts toward the outer side from the second magnetic vacant part 12. Thereby, in the second rotator 3, the thickness of the bridge part in the radial direction can be set up to be small.

Moreover, as shown in FIG. 3 and FIG. 4, the bridge part in the circumference direction is constituted by magnetic materials, which adjoin in the circumference direction and prevent the short circuit of magnetic flux and inserted into space parts (a first hollow part 103 and a second hollow part 303). And, the width W1 of the bridge part in the circumference direction of the first rotator 1 is set up to be larger than the width W2 of the bridge part in the circumference direction of the second rotator 3. By this configuration, it becomes possible to enhance the prevention of scattering of permanent magnets by a centrifugal force.

According to this Embodiment 1, the demagnetization resistance can be improved by having a deeper embedding position of the first permanent magnet 102. Additionally, the decrease of torque is made smaller, since the first permanent magnet 102 is stored on the inside of the first rotator, where the first permanent magnet is inclined at a predetermined angle, with respect to the line segment which shows the magnetic pole center, when viewed from the first rotation axis 2. That is, the used amount of permanent magnets which constitute one magnetic pole of the first rotator 1 is increased, which contributes to the suppression of the decrease in torque. Furthermore, permanent magnets of flat plate shape are used, and the relation about the angle θ is made to satisfy the relation of θ<90°, where the angle θ makes between the direction of the flat plate magnet and the line segment which shows the magnetic pole center, when viewed from the rotation axis center. Thereby, it becomes possible to use magnets of flat plate shape with low manufacturing cost, while the used amount of magnet is increased, and the suppression of manufacturing cost can be expected.

Embodiment 2

Figure 5:
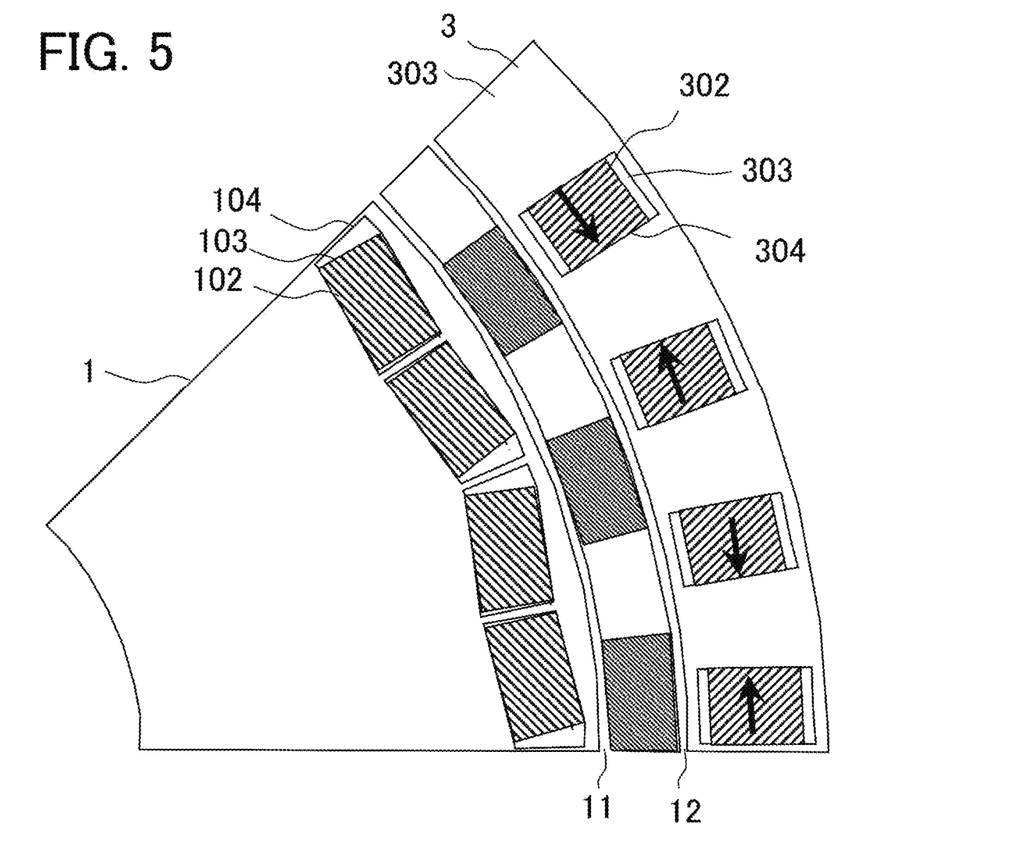
FIG. 5 is a partial sectional view of the magnetic flux modulation type magnetic gear according to the Embodiment 2.

FIG. 5 is a partial sectional view which shows the constitution of the magnetic flux modulation type magnetic gear according to the Embodiment 2. In this Embodiment 2, arrangement of the second permanent magnet 302 of the second rotator 3 according to the Embodiment 1 is changed. As shown in this FIG. 5, second permanent magnets 302 are embedded so as to have the magnetization in a circumference direction. Other configurations are the same as those of the Embodiment 1. A plurality of second permanent magnets 302 are arranged so that the direction of magnetization may become the circumference direction of the second rotator 3. Thereby, a magnetic path which concentrates magnetic flux on the second magnetic vacant part 12 is constituted. By this configuration, magnetic flux utilization rate is improved, and in addition, the distance with an adjoining permanent magnet is separated. Thereby, since a permanent magnet with a large volume can be used, the increase in the used amount of magnets can be set up freely, and the flexibility of a design can be improved.

Embodiment 3

Figure 6:
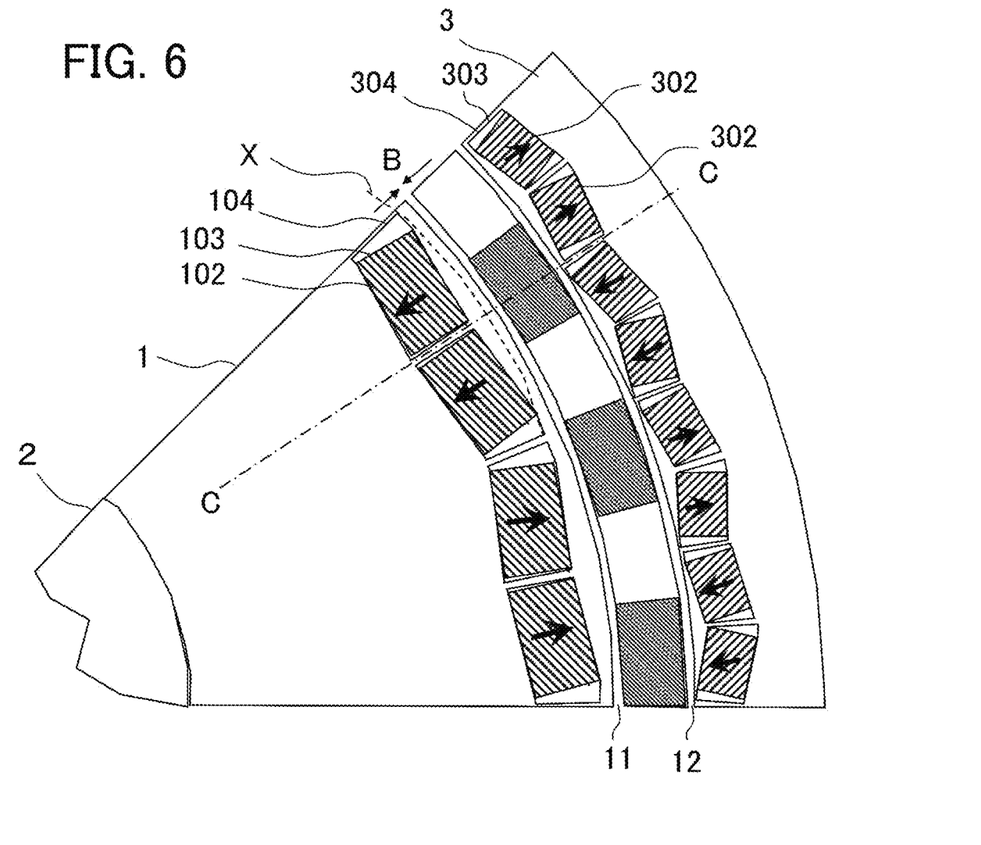
FIG. 6 is a partial sectional view of the magnetic flux modulation type magnetic gear according to the Embodiment 3.

FIG. 6 is a partial sectional view which shows the constitution of the magnetic flux modulation type magnetic gear according to the Embodiment 3. In this Embodiment 3, the second permanent magnet 302 of the second rotator 3 according to the Embodiment 1 is changed. In the second permanent magnets 302 of the second rotator 3, a configuration is employed in which two permanent magnets are used per magnetic pole. Additionally, two second permanent magnets 302 which constitute one magnetic pole are both magnetized in the direction of the second magnetic vacant part 12, and adjoining magnetic poles are reversed in the magnetization direction. Other configurations are the same as those of the Embodiment 1. The used magnet amount of the second permanent magnets 302 of the second rotator 3 can be increased, like the first rotator 1. Moreover, improvement is achieved also about the demagnetization resistance of the second permanent magnets 302 of the second rotator 3.

Embodiment 4

Figure 7:
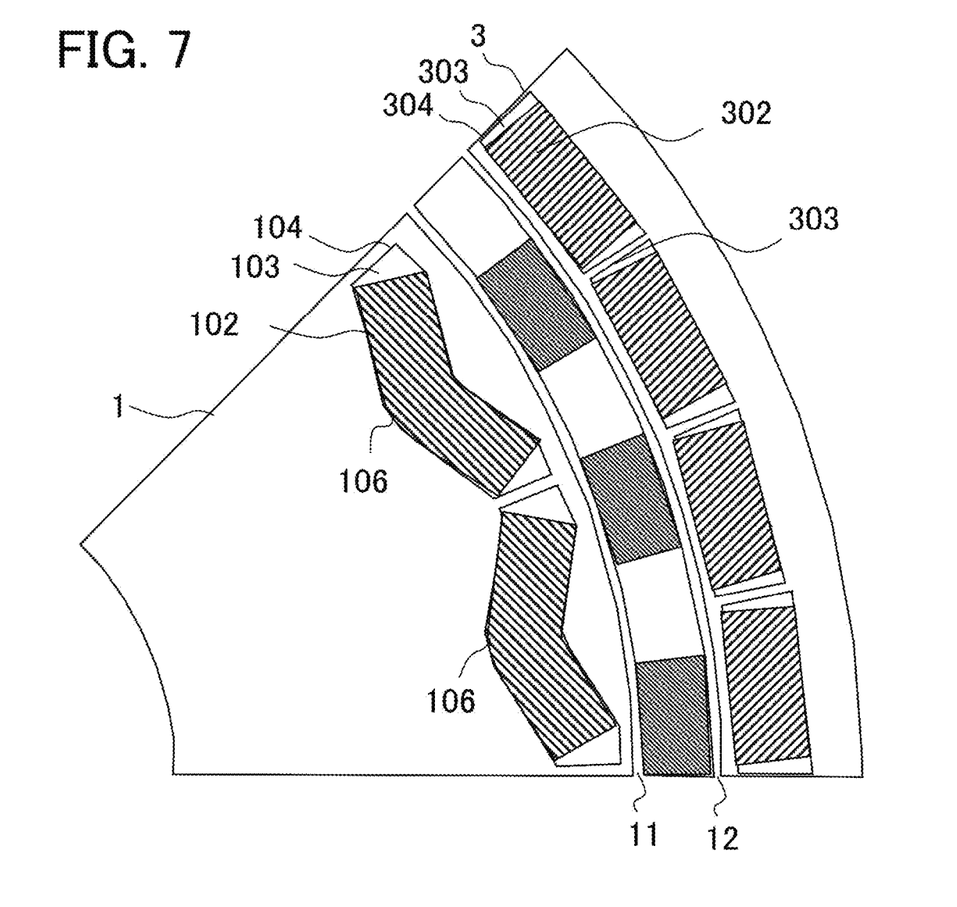
FIG. 7 is a partial sectional view of the magnetic flux modulation type magnetic gear according to the Embodiment 4.

FIG. 7 is a partial sectional view which shows the constitution of the magnetic flux modulation type magnetic gear according to the Embodiment 4. In the first permanent magnet 102 of the first rotator 1, a configuration is employed in which every magnetic pole includes one magnet. Additionally, the first permanent magnet has the structure to have, near the center of a magnetic pole, a bend part 106 toward the direction farther away from the first magnetic vacant part 11. With this configuration of the bending portion 106, the same effect as in the Embodiment 1 can be acquired, while suppressing the number of permanent magnets used. As the permanent magnet material of the first rotor 1, bond magnet having a high degree of design freedom in shape can be used. Other configurations are the same as those of the Embodiment 1. Moreover, a synergistic effect can be expected by performing the configuration of the first rotor 1, in combination with the configuration of the second rotor 3 according to the Embodiment 2 or the Embodiment 3.

Embodiment 5

Figure 8:
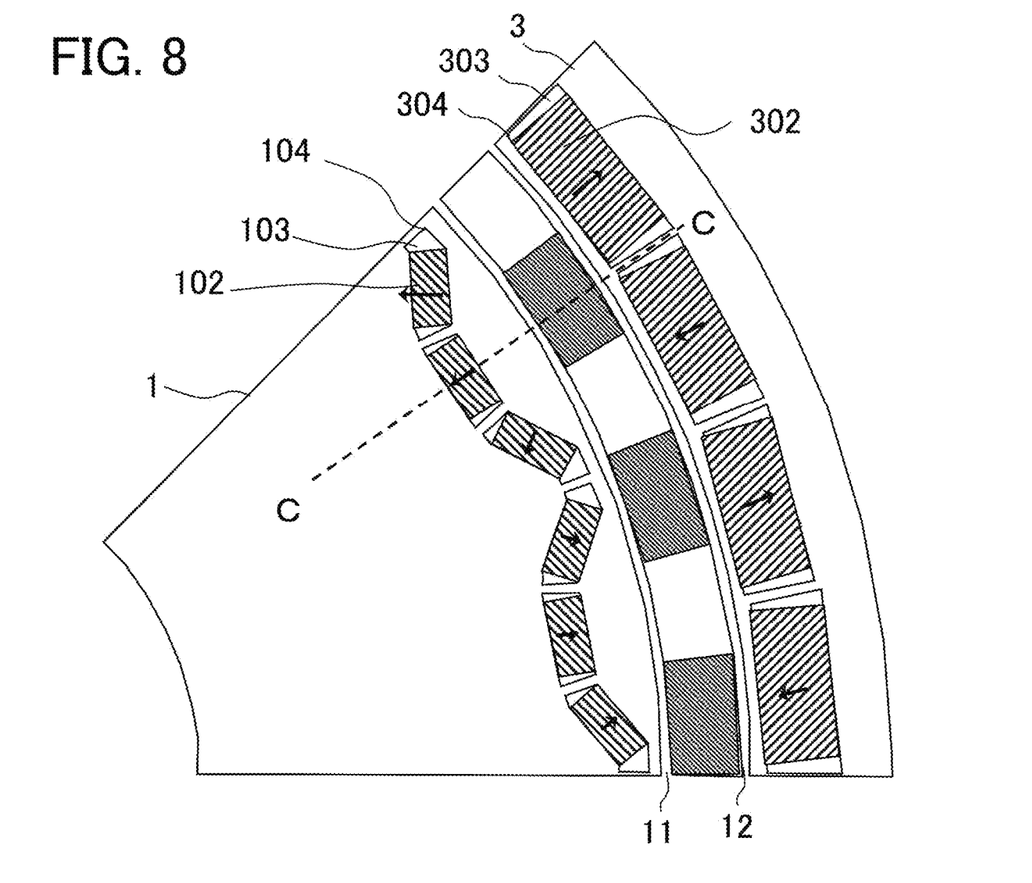
FIG. 8 is a partial sectional view of the magnetic flux modulation type magnetic gear according to the Embodiment 5.

FIG. 8 is a partial sectional view which shows the constitution of the magnetic flux modulation type magnetic gear according to the Embodiment 5. As shown in the drawing, in the first permanent magnets 102 of the first rotator 1, a configuration is employed in which every magnetic pole includes three flat plate shaped magnets. Among them, two magnets are symmetrically embedded, at an angle below 90° with respect to a magnetic pole center, and one remaining magnet is embedded, perpendicularly and, at the same time, symmetrically, with respect to the magnetic pole center.

As for the first permanent magnets 102 of the first rotator 1, each of them is magnetized in the short side direction of the flat plate shaped magnet, and their adjoining magnetization directions are reversed each other. When the angle which makes between the direction of each flat plate magnet and the line segment (the dashed line C in the drawing) which indicates the magnetic pole center, when viewed from the rotation axis center is set to be θ, two magnets fulfill the relation of θ<90°, and one remaining magnet fulfills the relation of θ=90°, and, in addition, is embedded so as to become symmetrical with respect to the line segment which indicates the magnetic pole center. By this configuration, the magnetic material domain between the first permanent magnet 102 of the first rotator 1 and the first magnetic vacant part 11 can further be expanded, and the further improvement in demagnetization resistance and the reduction of loss by an eddy current can be achieved. Other configurations are the same as those of the Embodiment 1. Moreover, a synergistic effect can be expected by performing the configuration of the first rotor 1, in combination with the configuration of the second rotor 3 according to the Embodiment 2 or the Embodiment 3.

Embodiment 6

Figure 9:
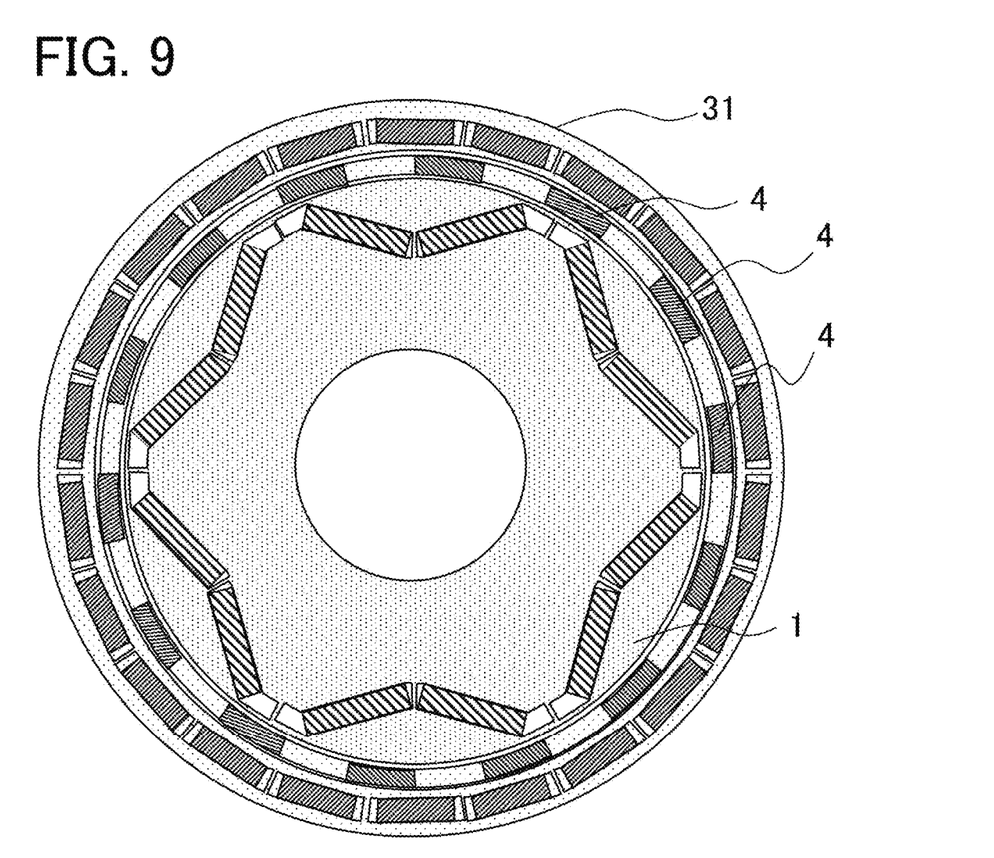
FIG. 9 is a partial sectional view of the magnetic flux modulation type magnetic gear according to the Embodiment 6.

FIG. 9 is a partial sectional view which shows the constitution of the magnetic flux modulation type magnetic gear according to the Embodiment 6. In this Embodiment 6, the pole piece 4 is configured to be rotated by a certain external force, and in addition, the second rotator 3 is fixed. Since the second rotator 3 does not rotate, it is hereby decided that the second rotator is referred to as an outer side magnetic pole structure 31. In this way, since the outer side magnetic pole structure 31 is fixed, it becomes easy to attach a cooling mechanism there, and the risk of thermal demagnetization of magnets can be reduced. Moreover, while the permanent magnets of the first rotator 1 have six poles, the outer side magnetic pole structure 31 has twenty-two poles. As for the pole piece 4, fourteen pieces are included. Other configurations are the same as those of the Embodiment 1.

When the outer side magnetic pole structure 31 is fixed in this way, from the principle of the magnetic flux modulation type magnetic gear, the following equation is obtained: (speed reduction ratio)=(the number of pole pieces 4)/(the pole number of the first rotator 1). That is, the speed reduction ratio according to the present Embodiment is 14/3=4.67, and can acquire a larger value, rather than the speed reduction ratio of 22/6=3.67, which belongs to the case where the outer side magnetic pole structure 31 is in rotation, and the pole piece 4 is fixed. Furthermore, the ratio of the pole number of the first rotator 1 to the pole number of the outer side magnetic pole structure 31 does not become an integer, and is expressed as an irreducible fraction. At this time, from the principle of magnetic gears, the degree of cogging torque, due to the interaction of the magneto motive force between the first rotator 1 and the outer side magnetic pole structure 31, is expressed as the lowest common multiple of the pole number of the first rotator 1 and the pole number of the outer side magnetic pole structure 31.

From this, when the ratio of pole numbers is expressed as an irreducible fraction, the degree of cogging torque becomes large (For example, in the present Embodiment, the pole numbers have the greatest common divisor GCD (6, 22)=2, and the degree of cogging torque is the lowest common multiple LCM (6, 22)=66. In contrast, in the previous example, the pole numbers have the greatest common divisor GCD (6, 24)=6, and the degree of the cogging torque is LCM (6, 24)=24.), compared with the case where pole numbers are the combination of the pole numbers, which are close to the ratio of pole numbers and expressed as an integer (For example, in the case where the pole number of the outer side magnetic pole structure 31 is set to be twenty-four, and the pole number of the first rotator 1 is set to be six, the ratio of the pole numbers becomes 24/6=4), since the pole number of the first rotator 1 and the pole number of the outer side magnetic pole structure 31 do not have a common measure which is larger than two. As for the cogging torque, as the degree is large, the amplitude becomes generally small. Thereby; like the present Embodiment, when a number which is expressed as an irreducible fraction and does not become an integer is chosen as the ratio of the pole number of the first rotator 1 to the pole number of the outer side magnetic pole structure 31, the vibration and noise due to the cogging torque can be reduced.

That is, when the greatest common divisor of the pole number of the first rotator and the pole number of the second rotator is two, the cogging torque can be made small. Moreover, the fact that the degree of cogging torque is large means that the degree of variation in magnetic energy is large, namely, that the outer skin depth of harmonic magnetic flux which permeates iron core material due to a skin effect becomes small. Thereby, the amount of the harmonic magnetic flux passing a magnet via the iron core can be reduced, and the demagnetization resistance can be improved by the synergistic effect with embedding the permanent magnet in the iron core.

It is worth noticing that, in the above Embodiments 1-5, shown is a case where the number of magnetic poles of the first rotator 1 is sixteen poles, the number of magnetic poles of the second rotator 3 is thirty-two poles, and the pole piece 4 is twenty-four. However, the similar effect will be acquired in the case where the combination of the pole number and the number of the pole piece 4 is different from this example. Similarly; in the Embodiment 6, shown is a case where the number of magnetic poles of the first rotator 1 is six poles, and the number of magnetic poles of the second rotator 3 is twenty-two poles, and the number of the pole pieces 4 is fourteen. However, the same effect is acquired even in a case where the ratio of the pole number of the first rotator 1 to the pole number of the outer side magnetic pole structure 31 does not become an integer, and is expressed as an irreducible fraction, and in addition, the combination of the pole number and the number of the pole piece 4 is different from this case. Moreover, although in the above Embodiments, shown is a case where the number of magnets per one magnetic pole is one, two, and three, the same effect is acquired at the case of four or more magnets.

Moreover, in the above Embodiments 1-5, shown is a case where the ring component by the pole piece 4 is arranged as a stator, and to this stator, a small in number pole rotor as the first rotator 1 is arranged at the inner diameter side, and a large in number pole rotor as the second rotator 3 is arranged at the outer diameter side. However, the same effect can be acquired, also when the small in number pole rotor is arranged at the outer diameter side and the large in number pole rotor is arranged at the inner diameter side. Moreover, in the above Embodiments 1-5, shown is a case where a small in number pole rotor and a large in number pole rotor which have permanent magnets are free to rotate, and in addition, the pole piece 4 is fixed. However, it is allowed that the pole piece 4 is configured to be rotated by a certain external force, like the Embodiment 6. In this case, when the revolving speed relation between the two rotors of inside and outside, and the ring component of pole pieces is set up, the relation of mechanical planet gears can be achieved.

Furthermore, the small in number pole rotor or the large in number pole rotor may be fixed.

An exemplary case in which one magnetic pole of the second rotator 3 is constituted by two permanent magnets which are put in order in the radial direction is explained in the Embodiment 3. However, combining the use of two or more permanent magnets and the arrangement in the axis direction can constitute an embodiment. When using two or more permanent magnets, permanent magnets of flat plate shape which are standard products of a constant size are used, for example. Combining those magnets in the radial direction and also in the axis direction, a first hole part for embedding a magnet will be designed, so that one magnetic pole can be constituted. Thereby, in addition to the above effect, the effect of suppressing the cost in manufacturing can be acquired. The present effect becomes remarkable, when the magnetic flux modulation type magnetic gear constitutes, in particular, a magnetic gear of multi poles or of a high speed-reduction ratio, for example, when using the magnetic gear for the deceleration mechanism of a car use main motor.

Moreover, in the above Embodiments, only when the magnetic structure per pole is symmetrical, with respect to the center of magnetic poles is shown. However, an asymmetrical magnetic structure is also allowed with respect to the center of magnetic poles, and the same effect can be acquired also when the magnetic structure has the characteristics which are different in the rotation direction. Moreover, in the above Embodiments, shown is a case in which the magnetic flux modulation type magnetic gear of radial type, whose magnetic vacant part is parallel to the rotation axis, is employed. However, the same effect can be acquired also when an axial type is employed whose magnetic vacant part is perpendicular to the rotation axis.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 First Rotator; 2 First Rotation Axis; 3 Second Rotator; 4 Pole Piece; 5 Stator; 6 Second Rotation Axis; 3 First Bearing; 8 Second Bearing; 9 Magnetic Coupling Part; 10 Stator Part; 11 First Magnetic Vacant Part; 12 Second Magnetic Vacant Part; 31 Outer Side Magnetic Pole Structure; 101 First Magnetic Material; 102 First Permanent Magnet; 103 First Hollow Part; 104 First Hole Part; 105 Bridge Part; 106 Bend Part; 301 Second Magnetic Material; 302 Second Permanent Magnet; 303 Second Hollow Part; 304 Second Hole Part

What is claimed is:

1. A magnetic flux modulation type magnetic gear, comprising:
   a ring component, which has pole pieces provided in a torus shape,
   a first rotator, which is arranged concentrically with the ring component and on the inside of the ring component, has a plurality of magnetic poles, each provided with a first permanent magnet, and can rotate relative to the pole pieces, setting a center of the ring component as a rotation axis, and
   a second rotator, which is arranged concentrically with the ring component and on the outside of the ring component, and has a plurality of magnetic poles, each provided with a second permanent magnet, and can rotate relative to the pole piece, setting the center of the ring component as the rotation axis,
   wherein, on the inside of the first rotator, there is provided with a first hole part for storing the first permanent magnet, having inclination of a predetermined angle with respect to a line segment, which shows a magnetic pole center, when viewed from the rotation axis,
   wherein a circumference direction thickness size of a bridge between the first hole part of the first rotator and an adjoining hole part is larger than a circumference direction thickness size of a bridge between the second hole part which stores the second permanent magnet of the second rotator and an adjoining hole part.

2. The magnetic flux modulation type magnetic gear according to claim 1,
   wherein the first hole part has a hollow part at an end part of the first permanent magnet.

3. The magnetic flux modulation type magnetic gear according to claim 2,
   wherein, corresponding to one of the magnetic poles of the first rotator, the first permanent magnets are stored in each of the first hole parts which are provided at a predetermined interval.

4. The magnetic flux modulation type magnetic gear according to claim 1,
   wherein a magnetic pole whose central portion is arranged in V shape, along the direction of a rotation center of the first rotator is constituted of the first permanent magnets.

5. The magnetic flux modulation type magnetic gear according to claim 1,
   wherein one magnetic pole of the second rotator is constituted of a plurality of second permanent magnets.

6. The magnetic flux modulation type magnetic gear according to claim 1,
   wherein the first permanent magnets stored in the first hole part are of flat plate shape, and
   the first permanent magnets are symmetrically arranged, at an angle below 90°, with respect to the line segment which shows the magnetic pole center, when viewed from the rotation axis.

7. The magnetic flux modulation type magnetic gear according to claim 1,
   wherein the second rotator is fixed, and the pole pieces are free to rotate.

8. The magnetic flux modulation type magnetic gear according to claim 1,
   wherein the greatest common divisor of a pole number of the first rotator and a pole number of the second rotator is two.

* * * * *